(12) United States Patent
Campbell et al.

(10) Patent No.: US 10,110,416 B2
(45) Date of Patent: Oct. 23, 2018

(54) METHOD AND SYSTEM FOR USER EQUIPMENT CONFIGURATION

(75) Inventors: Alistair James Campbell, Kent (GB); Tuomas Syrjänen, Helsinki (FI); Sampsa Vehkamäki, Helsinki (FI); Timo Hyväjoa, Espoo (FI); Jukka Rantala, Espoo (FI); Seppo Pientarinen, Helsinki (FI); Oliver James Bradley, Surrey (GB); Christopher Hugh Gibson, London (GB); Gavin Ronald Paul Miller, Middlesex (GB)

(73) Assignee: Truphone Limited (GB)

( * ) Notice: Subject to any disclaimer, the term of this patent is extended or adjusted under 35 U.S.C. 154(b) by 681 days.

(21) Appl. No.: 12/300,779

(22) PCT Filed: May 15, 2007

(86) PCT No.: PCT/GB2007/001790
§ 371 (c)(1),
(2), (4) Date: Apr. 10, 2009

(87) PCT Pub. No.: WO2007/132233
PCT Pub. Date: Nov. 22, 2007

(65) Prior Publication Data
US 2009/0327398 A1   Dec. 31, 2009

(30) Foreign Application Priority Data
May 15, 2006   (FI) .................................. 20060479

(51) Int. Cl.
*G06F 13/00*   (2006.01)
*H04L 12/24*   (2006.01)
(Continued)

(52) U.S. Cl.
CPC ........ *H04L 41/0266* (2013.01); *H04L 41/028* (2013.01); *H04L 41/0806* (2013.01); *H04L 41/0843* (2013.01); *H04L 63/08* (2013.01); *H04L 67/28* (2013.01); *H04L 67/289* (2013.01); *H04L 67/2823* (2013.01); *H04L 67/34* (2013.01); *H04W 8/245* (2013.01);
(Continued)

(58) Field of Classification Search
CPC . H04L 67/289; H04L 41/0266; H04L 41/028; H04L 41/0806; H04L 41/0843; H04L 63/08; H04L 67/28; H04L 67/34; H04L 67/2823; H04L 41/0226; H04L 41/28; H04W 8/245
USPC ................................ 709/202, 220–222, 223
See application file for complete search history.

(56) References Cited

U.S. PATENT DOCUMENTS

| | | | | |
|---|---|---|---|---|
| 2002/0120779 A1* | 8/2002 | Teeple et al. | .................. | 709/246 |
| 2003/0065777 A1* | 4/2003 | Mattila et al. | ................ | 709/225 |

(Continued)

*Primary Examiner* — Kenneth R Coulter

(57) ABSTRACT

A method of managing configuration of user equipment that has a configuration database modifiable with configuration data in a first format, and a communications unit for receiving configuration data in a second format is described. The method comprises storing a user agent at the user equipment; providing received configuration data in the second format to the user agent; using the user agent to transform the configuration data into the first format in the user equipment; and modifying the configuration database with the configuration data in the first format.

16 Claims, 12 Drawing Sheets

(51) Int. Cl.
*H04L 29/06* (2006.01)
*H04W 8/24* (2009.01)
*H04L 29/08* (2006.01)

(52) U.S. Cl.
CPC ............... *B65H 2301/4148* (2013.01); *B65H 2301/41487* (2013.01); *B65H 2511/12* (2013.01); *H04L 41/0226* (2013.01); *H04L 41/28* (2013.01)

(56) References Cited

U.S. PATENT DOCUMENTS

| | | |
|---|---|---|
| 2004/0218045 A1 | 11/2004 | Bodnar |
| 2005/0085225 A1* | 4/2005 | Benco et al. ................. 455/424 |
| 2005/0090239 A1* | 4/2005 | Lee et al. ..................... 455/418 |
| 2005/0096086 A1* | 5/2005 | Singamsetty ................ 455/557 |
| 2006/0077941 A1* | 4/2006 | Alagappan et al. .......... 370/338 |
| 2006/0106806 A1* | 5/2006 | Sperling et al. ............... 707/10 |
| 2006/0193321 A1* | 8/2006 | Shell et al. ................... 370/389 |

* cited by examiner

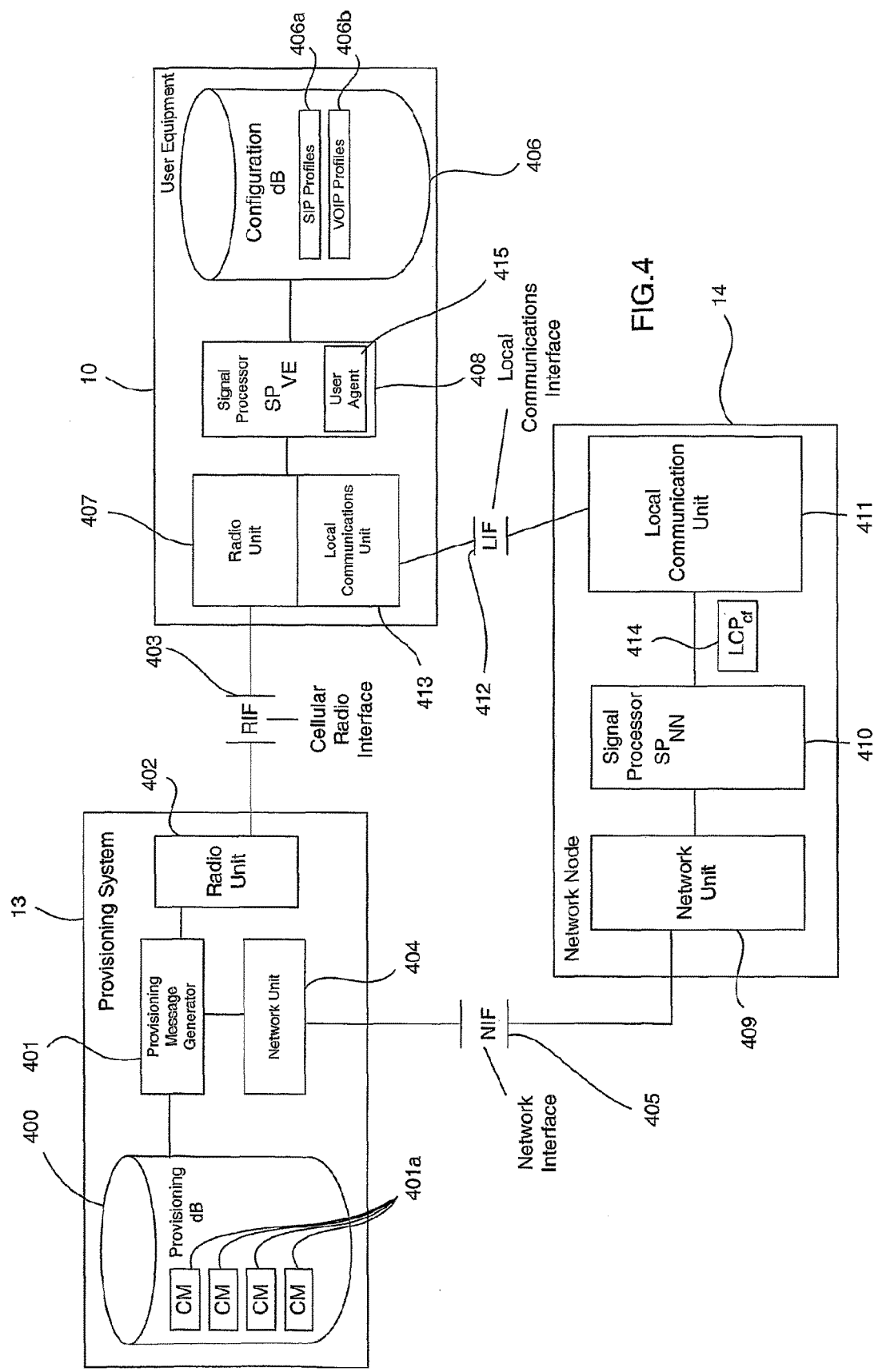

METHOD AND SYSTEM FOR USER EQUIPMENT CONFIGURATION

CROSS REFERENCES TO RELATED APPLICATIONS

This application claims priority to international application number PCT/GB2007/001790 filed on May 15, 2007 which claims priority to Finnish patent application number 20060478 filed on May 15, 2008, the entire disclosures of which are hereby incorporated by reference.

FIELD OF THE INVENTION

The present invention relates to a method and system for user equipment configuration and more specifically to the process of provisioning user equipment. More particularly, though not exclusively, the present invention concerns a secure and robust communications protocol suitable for enabling any provisioning system to configure a remote mobile telecommunications device preferably via a local radio network node. The present invention also extends to a method and system for securely registering and authenticating subscribers of a communications service.

BACKGROUND OF THE INVENTION

Advanced communication systems provide a plurality of services that can be enabled, disabled and adjusted to individual users by appropriate provisioning. Accordingly, provisioning configures any required devices, and provides users with access to data and technology resources. The steps of provisioning also include creation, maintenance and deactivation of user objects and user attributes, as they exist in the device.

The most obvious mechanism to provision a user agent operating on the device is to use the graphical user interface of the device. This, however, is a very laborous task and vulnerable to errors. Client provisioning is an automated mechanism that allows device settings to be configured with a minimum user interaction. In client provisioning, a message containing configuration information for a particular service is sent to a device and after user confirmation that the configuration is allowable is used to configure the device. Nowadays, the most commonly used way of client provisioning is to deliver the configuration information in Wireless Application Protocol (WAP) binary encoded provisioning XML documents (WBXML) via a primary telecommunicaitons channel of the device. In the field of mobile telecommunications, client provisioning is typically carried out over the air for example using a GPRS network, a 3G network or inshort messages.

However, there exist communication situations where client provisioning operations are necessary, but the communication media between the source of the provisioning information and the device is not available. Such a situation occurs, for example, with mobile telecommunication stations in areas of poor network coverage. In a challenging radio environment, the message comprising the provisioning information cannot be delivered to the mobile station and initialition of a new service or reconfiguring an existing one fails. Such communication situations are not that unusual, and a clear need for an alternative solution exists. One such solution could be local provisioning but this also has some limitations as described below.

A mobile station could provide a local application programming interface (API) to the configuration information database. For several reasons, especially for security, such application programming interface does not exist in the current mobile stations, or is available only to a part of the configuration information.

According to the state of the art, local provisioning could also be implemented by feeding the information through different, locally available delivery media, for example in a secure card that is read though the subscriber identity module (SIM) input/output interface, or through a Bluetooth, an Infrared (IR) or a Wireless Local Area Network (WLAN) interface, or through a cable. However, the configuration information is in practice manipulated in a proprietary way in the device and the knowledge on format and content of the final configuration request is available only to a very limited group of parties. As the number of services and service providers increases considerably, more and more parties need to access a particular configuration information without the need for or even possibility of contribution by the device manufacturers.

There has been a proliferation of users of communications systems and devices for use in such systems. Access to subscriber services provided by such systems require users to identify themselves and to authenticate in some way their identity. There are several ways in which this is achieved in the prior art. For example, the user can simply have user credentials (such as a user name and password) which enable him or her to identify themselves to the subscriber. However, this manner of registering and authenticating the user to the subscriber is prone to fraud as usernames and passwords can be fraudulently obtained and used on another communications device.

Alternatively the user's equipment can be used as part of the subscriber's unique identity. For example, a mobile telecommunications device can have a Subscriber Identification Module (SIM) which has a unique network identity—an International Mobile Subscriber Identity (IMSI). Here, the user's network identity can be used to uniquely identify the user to the subscriber service. However, this is also not an ideal solution as is still possible for an unregistered user to modify the IMSI sent from their communications device to the subscriber service to match a registered subscriber's IMSI.

Furthermore, the network identifier does not provide an ideal global solution for international use of the subscriber service. This is because different network identifiers are required for different countries if roaming charges are to be avoided or local access numbers are to be made available.

Registration procedures for subscriber services which exist today to try to mitigate fraud opportunities, are lengthy, complex and require a significant amount of user interaction. Furthermore, these is disadvantaeously a high chance of duplicate account creation when a service is used in a different country.

BRIEF DESCRIPTION OF THE INVENTION

It is desired to overcome or substantially reduce at least some of the above-described problems. More particularly, one of the objects of the present invention is to provide a method and corresponding system for implementing the method to provide an improved mechanism for local provisioning of user equipment.

One aspect of the present invention is based on the idea of installing, in the user equipment, a user agent that is capable of transforming a configuration message received from a third party into a format accepted by, namely compatible with, the configuration management routines of the user equipment. The term third party refers to any entity apart from the manufacturer of the user equipment and the user of the equipment.

According to one aspect of the present invention there is provided a method of managing configuration of user equipment, comprising a configuration database modifiable with configuration data input in a first format, and a communications unit for receiving configuration data in a second format, the method comprising: storing a user agent at the user equipment; providing received configuration data in the second format to the user agent; using the user agent to transform the configuration data into the first format in the user equipment; and modifying the configuration database with the configuration data in the first format.

This aspect of the present invention provides a local provisioning method which advantageously does not require any user equipment manufacturer's contribution to implement the configuration. The present invention is also completely scalable with the ever-increasing number of services and service providers.

The user equipment typically comprises an inbox from which the configuration database receives configuration data in the first format and the method may further comprise inputting the configuration data transformed into the first format into the inbox. This advantageously provides a non-intrusive way of implementing the present invention, which maintains the much of the data flows with the user equipment whilst at the same time facilitating correct format conversion for configuration purposes.

Preferably the communications unit comprises a local radio communications unit for receiving the configuration data in the second format. The local radio channel advantageously provides a simple and straightforward implementation of configuration operations in any environment, including a challenging radio environment, to a plurality of users and service providers. The present invention also simplifies provisioning in circumstances where the radio environment is benign by reducing the provisioning actions and reducing the potential for user error or errors caused by the network, such as out of order delivery.

Preferably the method further comprises receiving the user agent and the configuration together in a local configuration package. This presents a simple mechanism for facilitating the required local provisioning.

The method may further comprise seeking authorisation of the configuration operation from the user of the user equipment and receiving a response, wherein the modifying step occurs only if the response confirms user authorisation of the configuration operation. In this way the user can advantageously be given the final control of whether the remote configuration should be allowed to occur.

It is also possible for the step of seeking authorisation to comprise providing a plurality of configuration options to the user and receiving a user response selecting one of the configuration options. This is a further advantageous option, which allows more user choice and control of how the user equipment is to be configured.

Also the step of seeking authorisation may comprise providing a configuration option comprising at least editable one parameter, and the receiving step may comprise receiving a response indicating at least one edited parameter. Again this provides a greater degree and resolution of control of how the user equipment is to be configured The method may advantageously further comprise generating a reconfiguration result message and transmitting the same to the source of the configuration message via the communications unit. This enable the source of the reconfiguration operation to keep track of the successful provisioning of the user equipment and allows the source ensure that the provisioning is actually effected.

The method may further comprise deleting the user agent after the transforming step has been performed. This is advantageous in situations where the user equipment may have severe memory limitations and so the storing of an agent is not required.

Preferably the user agent comprises a generic user agent and the method may further comprise reusing the user agent for transforming subsequent configuration messages. In situations where there is a high frequency of reconfigurations of user equipment there is no need to send the user agent repeatedly. This feature is highly advantageous in terms of efficiency in these circumstances in implementing the third party reconfigurations.

The above aspect of the present invention also extends to a communication system comprising a provisioning system, user equipment, and a network infrastructure for connecting the provisioning system with the user equipment, wherein: the provisioning system comprises means for delivering configuration data to the user equipment; and the user equipment comprises: a configuration database modifiable with configuration data in a first format, a communications unit for receiving configuration data from the provisioning server in a second format, a user agent configured to transform the received configuration data into the first format; and a configuration manager for modifying the configuration database with the transformed configuration data.

According to the above aspect of the present invention, these is also provided a provisioning server for use with a communication system comprising user equipment, and a network infrastructure for connecting the provisioning system with the user equipment, wherein the user equipment is provisioned to a service of the communication through a configuration database modifiable with configuration data in a first format, the provisioning server comprising: a signal processing unit for generating configuration data for one or more user equipment; a communications unit for transferring generated configuration data for one or more user equipment over the network infrastructure as application data in a second format. The above aspect of the present invention also extends to a network node for a communication system comprising user equipment, and a network infrastructure, wherein the user equipment is provisioned to a service of the communication through a configuration database modifiable with configuration data in a first format, the network node comprising: a network unit for receiving configuration data for the user equipment from a provisioning server; a signal processing unit for providing the user equipment with a user agent capable of transforming configuration data into the first format; and a local communication unit for transferring the user agent and configuration data to the user equipment.

According to a further view of the above aspect of the present invention, there is provided user equipment for a communication system, the user equipment comprising: a configuration database modifiable with configuration data in a first format; a communications unit for receiving configuration data in a second format: a user agent configured to transform received configuration data into the first format; a configuration manager for modifying the configuration database with the transformed configuration data.

Another different aspect of the present invention is to address the current problems of subscriber registration and verification described above. More particularly, it is desired to provide a method of registration and verification of a subscriber, which reduces fraud opportunities and is capable of being automated to minimise user interaction during the registration process.

According to this aspect of the present invention there is provided a method of authenticating an access request from remote user equipment to a central system via a communications network, the method comprising: receiving from the user equipment a pre-access request including a plurality of unique identifiers including a communications network identity identifier associated with the user equipment and a user equipment identifier; determining whether any one of the unique identifiers relates to an existing user record; sending a response message to the remote user equipment including an indicator of the result of the determining step; receiving the access request from the user equipment, the request including a set of user credentials relating to a stored user record; and using the received user credentials to retrieve a user record and to determine the validity of the received user credentials, wherein the user credentials can be authenticated as being from the user equipment by confirming whether the pre-access request was received from the same user.

This method reduces the above described fraud opportunities by carrying out a pre-check of any of the unique identities associated with the user. The result of the pre-check is only sent back to the user equipment which has the communications network identity such receipt of this response can be a required step in the operation of the user equipment to access the user record. This specifically prevents fraud caused by spoofing identities of registered users. Also authentication is possible of a subsequent access request by the system confirming that a pre-access request for that user record has been carried out previously. This can be implemented by a simple check of system access logs for example.

The benefits of improved security for two-stage access method, makes it possible to comply with all regulatory frameworks on lawful intercept of communications. Also this current aspect of the present invention enables fraudulent behaviour to identified and blocked by the system.

Furthermore, it is possible to effect this method with the advantageous requirement of only a single installation file for the user equipment, which may be distributed entirely separately from the subscriber registration process. Also in a mobile telecommunications application, a new device or SIM card can be enabled on demand and requires no arduous setup by the user.

By providing an indicator of the result of the determining step, the remote user equipment can be assisted in determining whether a new account needs to be set up or whether an existing account needs to be updated, which in turn helps to automate parts of the registration procedure.

The current aspect of the present invention enables a mobile telecommunications user for example to roam between multiple unique identifiers (for example different IMSI numbers for SIMs, and different IMEI numbers for mobile communications devices) whilst still keeping the same account with the subscriber. In this case, the additional IMEIs and IMSIs are simply added to the user's account record.

This in turn allows advanced subscriber behaviour such as:

Switching between different GSM numbers for presentation to called parties dependent on current country, allowing users to always appear to have a local number in each country they travel to; and Switching between different mobile communication devices to allow the user to access the same account on each device.

Preferably the pre-access request comprises an asynchronous request and the sending step comprises sending an asynchronous response message. Typically, these are, in a mobile telecommunications environment, SMS messages. The advantage of this is that there is little need for a secure communication for the pre-access communications as confidential account details are not being provided.

Advantageously the access request may comprise a synchronous request and the transmitting step comprises transmitting a synchronous authentication result message back to the user equipment. Use of a synchronous communications protocol provides speed and security for the communications and assists in automating the secure registration process.

More preferably the access request may comprise a HTTPS post. This is an efficient and speedy way of enabling the subscriber to respond with the access request which contains the required user credentials.

It is to be appreciated that a synchronous message is one which expects confirmation that the message has arrived. The confirmation is within the communication protocol and is automatic requiring no user intervention. This means that the operation of the sender can be required to receive the confirmation before proceeding and this makes the messaging protocol more robust and secure. Typically, a synchronous message is more secure than an asynchronous message because it is encrypted. It also has a lower transmission cost than an asynchronous message, for example within a WiFi local network. An HTTPS post is a synchronous message.

An asynchronous message is one which does not require a confirmation of delivery to be received within the messaging protocol. An asynchronous messaging protocol typically does not involve encryption of the data and so is less secure. However, if can be simpler to use and more suited to certain communication situations.

The method advantageously further comprises receiving an update message from the user equipment after transmitting a successful authentication result message to the user equipment, wherein the update message requests an update of a user record and comprises at least the unique communications network identity identifier associated with the user equipment and the unique user equipment identifier. The update message, which is sent after a successful access to the subscriber service has been achieved, still contains the identifiers which define the equipment source uniquely, which in turn provides further authentication of the updating request and also enables a cross-check relating to the known user account record to be carried out.

Other information relating to the user equipment can also be provided. For example, preferably, the update message further comprises a unique identifier of an access authentication program stored at the user equipment. This enables the server to identify what program is running on the user equipment, which may assist in configuration of the equipment. Also the update message may advantageously further comprise information indicating the originating source of the access authentication program. This enables the central system to keep track of distribution of the authentication program, which can be delivered to the remote user equipment by any channel.

Preferably, the update message further comprises identifiers for other programs stored on the user equipment. Again this assists the central system in determining how best to configure the remote user equipment to optimise the subscriber service that is to be provided to the user.

The update message may comprise a synchronous message. The benefits of a synchronous message have been described above.

Preferably the method further comprises determining whether the combination of received identifiers is unique and updating the user account if the combination of identifiers are unique. This acts as a further check, which prevents the updating of an account record if there is no new update information.

The current aspect of the present invention can also be considered to be the provision of a system for authenticating an access request received from remote user equipment via a communications network, the system comprising: receiving means arranged to receive from the user equipment a preaccess request including a plurality of unique identifiers including a communications network identity identifier associated with the user equipment and a user equipment identifier; determining means arranged to determine whether any one of the unique identifiers relates to an existing user record; sending means arranged to send a response message to the remote user equipment including an indicator of the result of the determining step; wherein the receiving means is arranged to receive the access request from the user equipment, the request including a set of user credentials relating to a stored user record; and wherein the system is arranged to use the received user credentials to retrieve a user record and to determine the validity of the received user credentials, wherein the user credentials can be authenticated as being from the user equipment by confirming whether the pre-access request was received from the same user.

The current aspect of the present invention also extends to a method of generating and handling an access request from remote user equipment to a central system via a communications network, the method comprising: constructing a pre-access request having a plurality of unique identifiers including a communications network identity identifier associated with the user equipment and a user equipment identifier; transmitting the preaccess request to the central system; receiving, from the central system, a response message; creating the access request including a set of user credentials relating to a user record stored at the central system; and sending the access request to the central system.

Alternatively, the current aspect of the present invention can be considered to be a remote user equipment for generating and handling an access request to a central system via a communications network, the user equipment comprising: constructing means arranged to construct a pre-access request having a plurality of unique identifiers including a communications network identity identifier associated with the user equipment and a user equipment identifier; transmitting means arranged to transmit the pre-access request to the central system; receiving means arranged to receive, from the central system, a response message; creating means arranged to create the access request including a set of user credentials relating to a user record stored at the central system; and sending means arranged to send the access request to the central system.

According to another aspect of the present invention there is provided a method of handling a registration request from remote user equipment to a central system via a communications network, the method comprising: receiving from the user equipment a pre-access request having a plurality of unique identifiers including a communications network identity identifier associated with the user equipment and a user equipment identifier; determining that none of the unique identifiers relates to an existing user record; sending a response message to the remote user equipment indicating the result of the determining step; receiving the registration request from the user equipment, the request including a set of user credentials and a plurality of unique identifiers including a communications network identity identifier associated with the user equipment and a user equipment identifier; setting up a new user record within the database and storing the received user credentials and the received identifiers within the new user record; and sending a response message to the remote user equipment indicating that the registration has been successful; wherein the received identifiers can be used to determine the authenticity of the user equipment by confirming whether the pre-access request was received from the same user equipment.

One key advantage of this method is that by carrying out a check for any recognised identifiers at the stage when a new user account record is requested, duplicate account record creation is mitigated. Each unique identifier is logged at new user registration and if it is used subsequently the previous account record can advantageously be identified.

BRIEF DESCRIPTION OF THE DRAWINGS

In the following the invention will be described in greater detail by means of preferred embodiments with reference to the accompanying drawings, in which:

FIG. 4 is a schematic block diagram illustrating logical units of each of the provisioning server, network node and user equipment of FIG. 1;

DETAILED DESCRIPTION OF THE PRESENTLY PREFERRED EMBODIMENTS OF THE INVENTION

The embodiments of the present invention described below are applicable to any communication system capable of providing communication services that may be individually provisioned to users of the communication system. Such systems include mobile communication systems, fixed telecommunication systems, and a variety of clustered combinations of them. However, in the following, the present embodiments are described in the context of configuring mobile user equipment.

Figure 1:
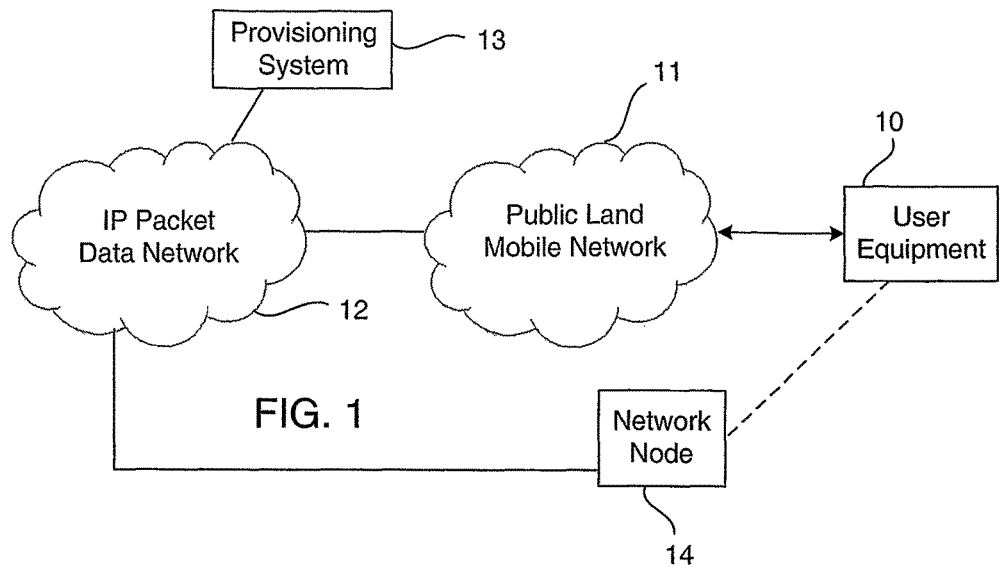
FIG. 1 is a schematic block diagram illustrating elements involved in configuring user equipment of a communication system in accordance with an embodiment of the present invention.

Referring to FIG. 1, an exemplary system embodying the present invention is shown. As an advantageous arrangement, FIG. 1 illustrates an embodiment where the configuration data for user equipment is generated in a provisioning server and delivered to the user equipment through a network node capable of local communication. The network node enables provision of the application (user agent) and the configuration data even in the absence of cellular coverage or alternative means for downloading configuration information, but it is not essential for the implementation of the present invention. The transfer mechanism for inputting the configuration data and the user agent capable of a necessary transformation procedure is not, as such, essential for the present invention. The specifications of communications systems and particularly wireless communications systems develop rapidly. Therefore, all terms and expressions should be interpreted broadly, since they are intended to illustrate, not to restrict the interpretation of the invention.

FIG. 1 is simplified system architecture and only shows some elements of the architecture of an exemplary system. The network nodes shown in FIG. 1 are logical units whose implementation may differ from what is shown. The logical units may be combined to each other, i.e. a functionality of one logical unit described below may be enhanced to comprise a functionality of another logical unit described below and/or a functionality of a prior art network node (logical unit). Additionally, the connections shown in FIG. 1 between network nodes are logical connections; the actual physical connections may be different than the logical connections. It is apparent to a person skilled in the art that the systems also comprise other functions and structures that will not be described in detail herein.

FIG. 1 illustrates user equipment (UE) 10 of a subscriber of a public land mobile network (PLMN) 11. The user equipment of a communication system can be a simplified terminal for speech only or a terminal for diverse services. In the latter case the terminal acts as a service platform and supports loading and execution of various functions related to the services. User equipment typically comprises mobile equipment (such as a mobile handset) and a subscriber identity module (SIM), typically a detachably connected identification card. In this context, the user equipment thus refers to the entity formed by the subscriber identity module and the actual mobile equipment. The subscriber identity module is typically a smart card that holds the subscriber (network) identity, performs authentication algorithms, and stores authentication and encryption keys and other subscription information that is needed at the mobile user equipment. The mobile equipment may be any equipment capable of communicating in a mobile communication system or a combination of several pieces of equipment, for instance a multimedia computer to which a card phone has been connected to provide a mobile telecommunications connection.

A mobile network refers generally to any telecommunications network that subscribers may access, and wherein the access point to the system may change when users are moving within the service area of the network. A typical mobile communications system is a Public Land Mobile Network (PLMN). The mobile communications network is often an access network providing a user with wireless access to external networks, hosts, or services offered by service providers. The configuration of PLMN will be discussed in more detail with reference to FIG. 2.

As an example of external networks, FIG. 1 illustrates an IP packet data network 12. An IP packet data network may comprise one or more networks that enable exchange of information using the Internet protocol. The IP packet data network 12 of FIG. 1 can thus represent a single local area network, a comprehensive multimode network that connects large numbers of terminals and computers over a wide area, or any combination of such.

FIG. 1 shows also a provisioning system 13 that may communicate with the user equipment 10 through the IP packet data network 12 and PLMN 11, and serves to provide configuration messages to the user equipment 10 of the communication system. The provisioning system may be embodied as a server, and is referred to by the general term provisioning server (PS) 13. A communication system may comprise one or more provisioning servers. A provisioning server may be operated by a PLMN network operator for a variety of services in the network, or by service providers offering different types of services.

The user equipment 10 is also capable of communicating locally with a network node (NN) 14. Local communication in this context refers to any communication that may be performed without involving the network connection, here without the cellular resources of the PLMN 11. Examples of the technologies available for the local communication comprise Wireless Local Area Network (WLAN), Bluetooth, Infrared, use of cables, etc. The network node 14 is connected to the IP packet data network 12 and is thus capable of exchanging information with the provisioning server 13.

Figure 2:
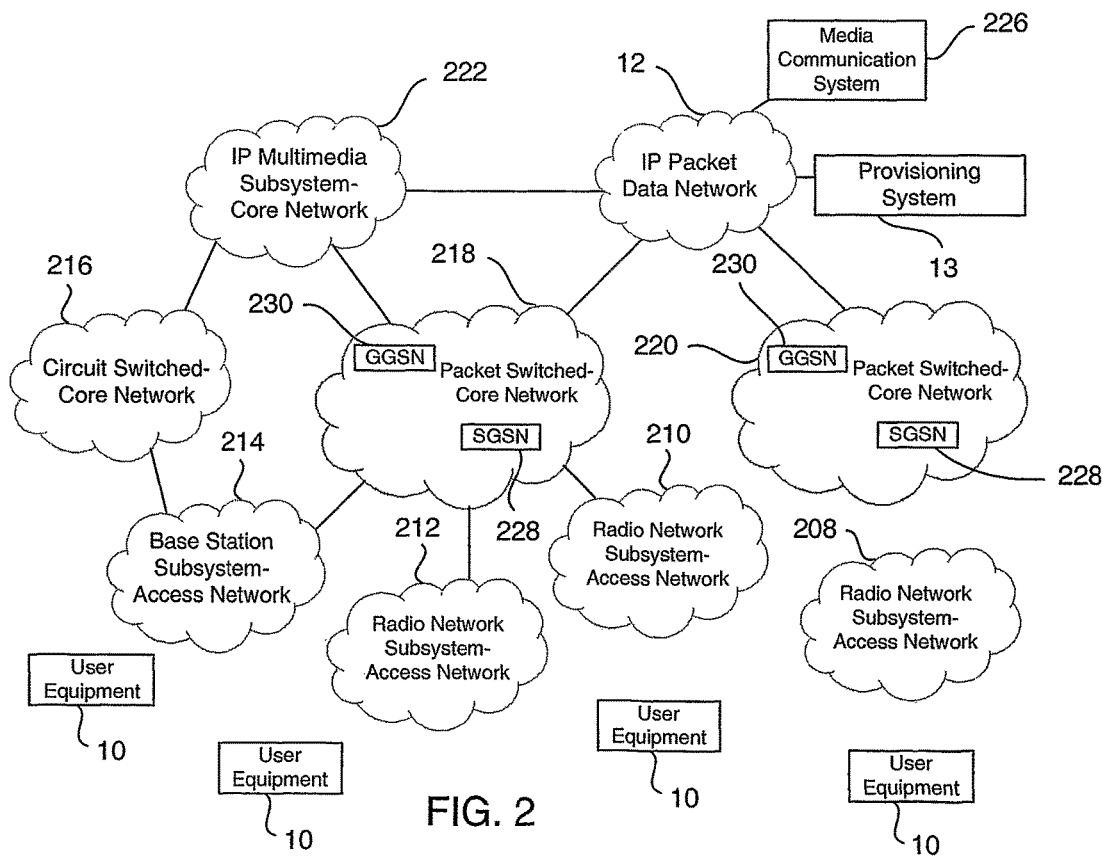
FIG. 2 is a schematic block diagram illustrating a configuration of a public land mobile network of FIG. 1.

As illustrated in FIG. 2, in mobile communications systems, a public land mobile network (PLMN) infrastructure may be logically divided into a core network (CN) 216, 218, 220, 222 and access network (AN) infrastructures 208, 210, 212, 214. A radio access network AN may thus refer, for example, to a base station subsystem (BSS) 214 for the GSM and radio network subsystem (RNS), or radio access network (RAN) 208, 210, 212 for the UMTS.

The core network CN may be logically divided into a circuit-switched (CS) domain 216, a packet-switched (PS) domain 218, 220 and an IP multimedia subsystem (IMS) 222.

The CS domain refers to a set of all the CN entities offering CS type of connection for user traffic as well as all the entities supporting the related signalling. A CS type of connection is a connection for which dedicated network resources are allocated when a connection is established and released when the connection is released.

A PS type of connection transfers the user information using packets so that each packet can be routed independently from the previous one. An example of the PS domain may be the GPRS (General Packet Radio Service), and the typical entities may include a serving GPRS support node (SGSN) 228 and a gateway GPRS support node (GGSN) 230. The IP multimedia subsystem comprises CN elements for provision of multimedia services. The IP multimedia subsystem IMS utilizes the PS domain to transport multimedia signalling and bearer traffic. Consequently, UE accessing the PS core network, and the PS core network itself, utilizes the services provided by the radio access network to provide packet-mode communication between the UE and the PS CN subsystem. The multiple access method employed in the air interface in the RAN may be Time Division Multiple Access (TDMA), Frequency Division Multiple Access (FDMA), Code Division Multiple Access (CDMA), or any other method or a combination thereof.

For delivery of configuration messages, mobile networks also provide an additional service for short messages (SMS). The radio interface of mobile network provides a service access point for short messages. This allows the messages in SMS to be transported as if they were signaling messages meant for a network entity, but they are, in a sense, user traffic because they are delivered to and consumed by the user in the user equipment.

In order to provide media communication services to the user equipment through the communication system, a packet based media communication system 226 may be provided on top of the mobile network. In FIG. 2, the media communication system is embodied as a server system, and it is generally referred to as an application server. A communication system may comprise a plurality of media communication servers.

As shown in FIG. 2, the provisioning server 13 may be connected to the IP packet data network 12 and utilize services of the communication system to exchange information with different communication parties. For example, a provisioning server 13 may deliver a configuration message to user equipment in a short message, or to a local network node in a data packet delivered over the IP packet data network 12.

Figure 3:
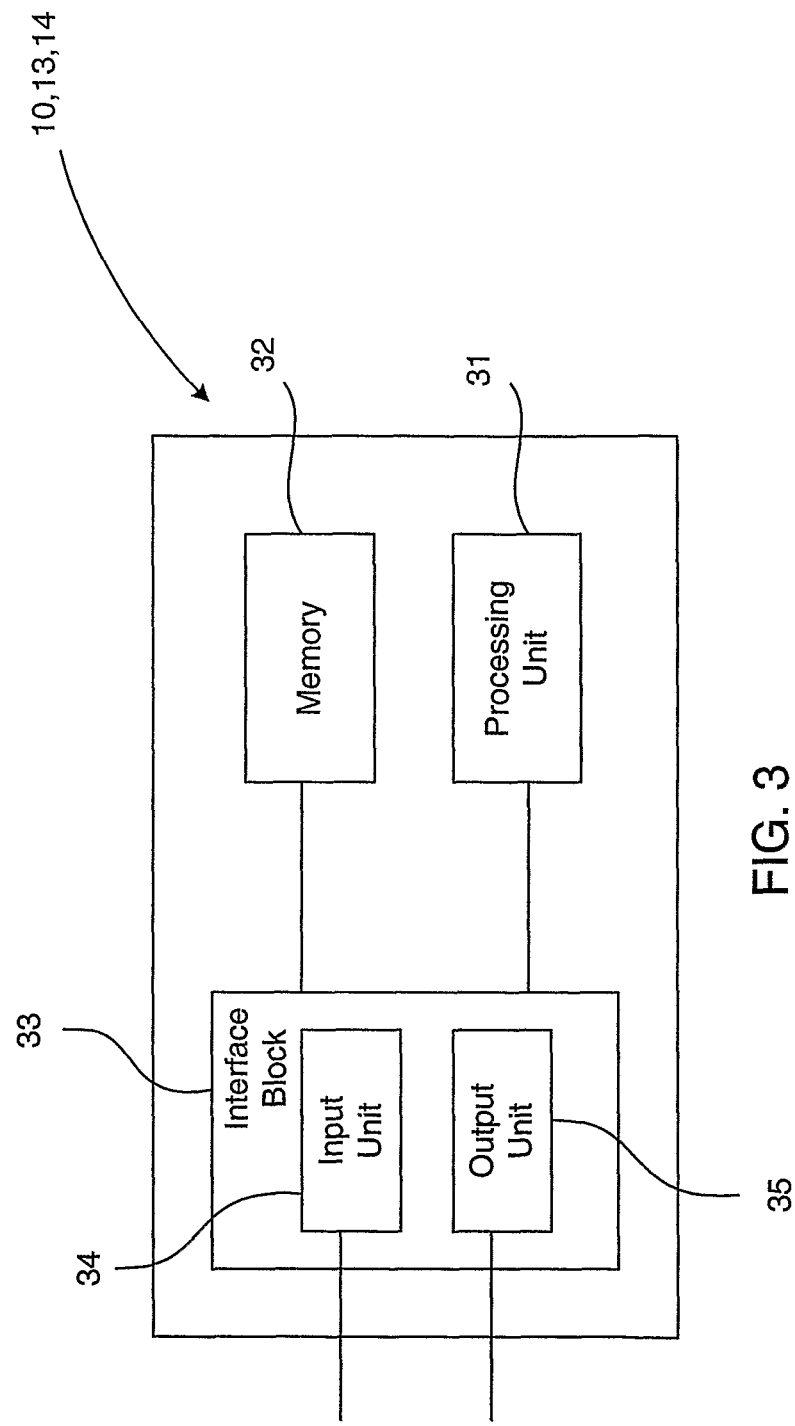
FIG. 3 is a schematic block diagram illustrating a minimum hardware configuration for the provisioning server, network node and user equipment of FIG. 1.

FIG. 3 illustrates a minimum hardware configuration for the implementation of the user equipment 10, provisioning server 13 and network node 14 elements of FIG. 1. The element comprises a processing unit 31, an element that comprises an arithmetic logic module, a number of special registers and control circuits. Connected to the processing unit is a memory unit 32, a data medium where computer-readable data or programs or user data can be stored. The memory unit 32 typically comprises memory modules that allow both reading and writing (RAM), and memory modules whose contents can only be read (ROM). The unit also comprises an interface block 33 with input unit 34 for inputting data for internal processing in the element, and output unit 35 for outputting data from the internal processes of the element.

Examples of said input unit in network elements 13, 14 comprise plug-in units acting as a gateway for information delivered to its external connection points. For receiving information from the operator of the network element, the interface block 33 of the network element may also comprise a keypad, or a touch screen, a microphone, or the like (not shown). Examples of said output unit 35 in network elements 13,14 include plug-in unit feeding information to the lines connected to its external connection points. For outputting information to the operator of the network element 14, they may also comprise a screen, a touch screen, a loudspeaker, or the like (not shown).

The interface block 33 of the user equipment 10 typically comprises at least a user interface unit for communicating with the user and a radio interface unit for communication over the cellular mobile network. In addition, the user equipment may comprise additional interface units, for communication over another type of cellular network, or in another frequency, or for local communication. Examples of the technologies used for the local communication comprise Wireless Local Area Network (WLAN), Wi-Fi, Wi-Max Bluetooth, Infrared, use of cables, etc. Depending on the application, the implementation of such interface units may comprise a plug-in unit exchanging information through lines connected to external connection points of the user equipment, or light/radio transceiver units with appropriate protocol stacks in the user equipment.

The processing unit 31, memory unit 32, and interface block 33 are electrically interconnected for performing systematic execution of operations on the received and/or stored data according to the predefined, essentially programmed processes of the element. In the present embodiments, the operations comprise functions for implementing the logical units, operations and interfaces of the elements 10, 13, 14 as will be described in the following.

FIG. 4 illustrates some logical units of the user equipment 10, provisioning server 13 and network node 14 elements of FIG. 1 used in implementing the current embodiment of the invention. The provisioning server 13 comprises a provisioning message generator 401 that through the internal processes of the provisioning server 13 resolves configuration information $\inf_{cf,UE}$ 401a stored in a provisioning database for particular user equipment 10, and creates a provisioning message $msg_{cf}$ 416 comprising the configuration information 401a for delivery to the user equipment 10. In a conventional system, the provisioning message generator 401 compiles the provisioning message $msg_{cf}$ into a short message, addresses the short message with the user identity of the user of the user equipment 10, and forwards the short message to the radio unit 402 of the provisioning server 13. A provisioning message is typically, but not necessarily, formulated as WAP binary encoded provisioning extensible markup language (XML) documents (WBXML). The radio unit 402 sends, at request (pull) or without a separate request (push), the short message to the user equipment 10 via the mobile communication network, illustrated as crossing the cellular radio interface (RIF) 403.

The provisioning message generator 401 of the embodied provisioning server 13 is further configured to compile the provisioning message $msg_{cf}$ into a data packet, address the data packet to a network node 14 authorized to handle configuration messages of the user of the user equipment 10, and forward the data packet to the network unit 404 of the provisioning server. The operation to send the configuration message 416 through the network unit 404 may be the primary, or sole functionality of the provisioning message generator 401, or it may be an alternative or secondary functionality initiated when delivery through the radio unit 402 is detected to fail. The network unit 404 sends the data packet through the IP packet data network, illustrated as crossing the network interface (NIF) 405.

The user equipment 10 comprises a configuration database 406 that comprises information on, for example, access points, Session Initiation Protocol (SIP) profiles 406a, and Voice over IP (VOIP) profiles 406b. This information may be modified with a formatted message from an authorized source. In the conventional way, the short message from the provisioning server 13 is received by the radio unit 407 of the user equipment 10, and forwarded to the signal processor 408 of the user equipment. The signal processor 408 detects the message to be a configuration message, implements necessary authorization procedures and if the authorization succeeds, implements a requested database operation in the configuration database 406 of the user equipment 10. Authorization procedures related to over-the-air (OTA) configuration are generally known to a person skilled in the art and will not be disclosed in more detail herein.

In the embodied solution, the network node 14 receives the data packet from the provisioning server 13 through a network unit 409. The network unit 409 forwards the data packet to the signal-processing unit 410 of the network node, which detects the data packet to comprise a configuration message $msg_{cf}$ comprising the configuration information for delivery to the user equipment 10. The signal-processing unit 410 of the network node creates a local configuration package $lcp_{cf}$ 414 comprising a user agent 415, and the configuration message $msg_{cf}$416 (see FIG. 4*a*) and forwards the local configuration package $lcp_{cf}$ 414 to the local communication unit 411 of the network node. The user agent 416 is generic, meaning that the same user agent may be used in the same format for different users, only the configuration message $msg_{cf}$416 changes. Additionally, the user agent 415 may be disposable or stored in the user equipment 10 for further use. In case of a disposable user agent, the user agent is deleted from the user equipment after each configuration operation. In case of a stored user agent 415, the local configuration package $lcp_{cf}$ 414 comprises the user agent 415 only in the first time it is sent and whenever it needs to be updated. At other times, only the configuration message $msg_{cf}$ 416 needs to be delivered from the network node 14 to the user equipment 10 and so the local configuration package 414 just provides the configuration message as shown in FIG. 4*b*. In the following embodiment, the mechanisms related to the first delivery of the configuration message are disclosed. Adjusting the procedure to the subsequent configuration operations according to the type of the user agent will be, in view of the above, clear to a person skilled in the art and therefore requires no further explanation herein.

The local communication unit 411 of the network node 14 sends the data package 414 to the user equipment 10 locally, illustrated in FIG. 4 as crossing the local communication interface (LIF) 412. As discussed above, examples of the technologies that may be used in the local communication include Wireless Local Area Network (WLAN), Bluetooth, Infrared, use of cables, or the like.

The local configuration package $lcp_{cf}$ 414 from the local network node 14 is received by the corresponding local communications unit 413 of the user equipment 10, and again forwarded to the signal processor 408 of the user equipment. This time the signal processor 408 detects the message to be a user agent 415, implements necessary authorization procedures and if the authorization succeeds, installs the user agent 415 in the user equipment 10.

Figure 5:
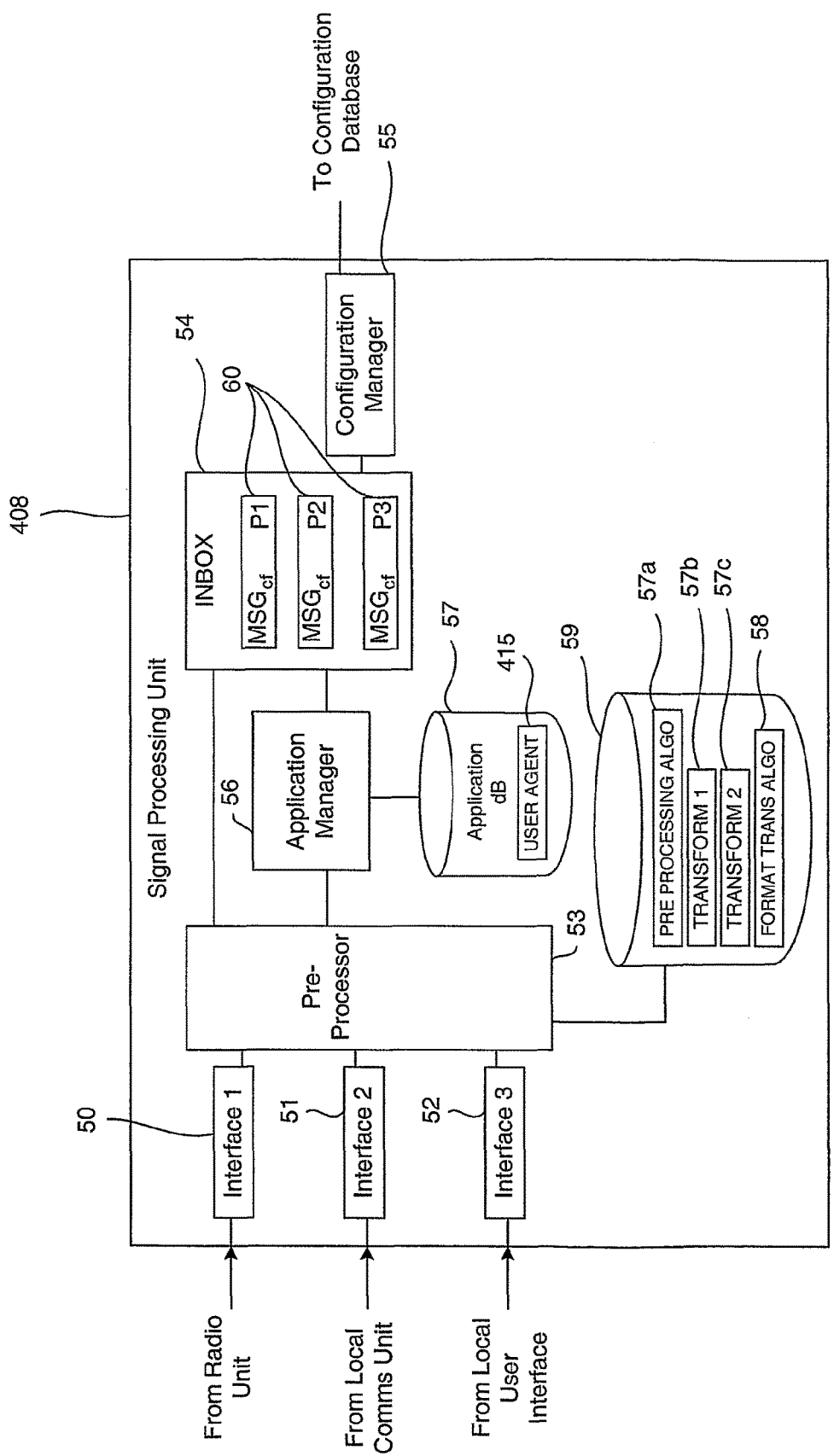
FIG. 5 is a schematic block diagram illustrating the logical modules in the signal processing unit of the user equipment of FIG. 4.

FIG. 5 illustrates in more detail the logical modules involved in implementing the current embodiment in the signal-processing unit 408 of the user equipment 10. FIG. 5 shows the signal-processing unit 408 to comprise a first interface IF1 50 for data streams related to the configuration messages 60, for example data streams from the radio unit 407. The signal-processing unit 408 of FIG. 5 also comprises a second interface IF2 51 for data streams related to applications, for example data streams from the local communication unit 413. The signal-processing unit 408 of FIG. 5 also comprises a third interface IF3 52 for data streams to and from the user interface (not shown) of the user equipment. Note that only interfaces necessary for illustrating the embodiment are disclosed herein. Additionally, for a person skilled in the art, it will be clear that the data streams from different interface units may be physically combined between the interface blocks 407, 413 and the signal processing unit 408, and interpreted in the signal processing unit 408 as separate data streams using a defined protocol.

The different data streams are input to a pre-processor 53 that detects an input dataflow, determines its type and, according to the determined type, implements a predefined pre-processing algorithm 57*a* which utilises one of a plurality of transforms 57*b* stored in a local data store 59, and forwards the data stream using a predefined functionality. Typically, a data stream related to a configuration message $msg_{cf}$416 received over the radio interface 407 in one format is manipulated with a predetermined format transformation algorithm 58 into another format applicable for controlling the configuration database operations. This predetermined format transformation algorithm 58 is provided by the user equipment manufacturer to enable the user equipment to be configured, typically, remotely using over-the messages such as SMS messages and information relating to it requires involving the user equipment manufacturer. Due to the provision of this format transformation algorithm 58, the network node 14 of a third party cannot directly submit a configuration message $msg_{cf}$ 416 received from the provisioning server 13 to the user equipment 10 in order to implement a configuration database operation.

The modified configuration message $msg_{cf,P}$ 60 received from the radio interface is forwarded to the inbox 54 of the messaging service used in the radio interface 50. In the present embodiment this relates to an SMS inbox 54 of the user equipment 10. Reception of the configuration data stream in the inbox 54 initiates a user authorization procedure. During the user authorization procedure, the inbox 54 stores the received data, forwards a message informing the user about an incoming message to the user interface 52, and receives through the use interface 52 the response of the user. In the case the authorization succeeds, the inbox 54 forwards the configuration data to the configuration manager 55. The configuration manager 55 is a logical module of the signal-processing unit that, according to the information in the received data streams, performs database operations on the configuration database 406. In the embodied example, the configuration manager 55 amends the records (such as the SIP profiles 406*a*, the VOIP profiles 406*b* and other stored user equipment configuration variables) in the configuration database 406 according to the parsed information of the XML document (configuration message 416).

A local configuration package $lcp_{cf}$ 414 arriving to the user equipment 10 through IF2 51 is detected by the pre-processor 53 to be an application and, typically without substantial pre-processing, forwarded to an application manager 56. The application in this embodiment is the user agent 415. The application manager 56 is a logical module of the signal processing unit 408 that, according to the information in the received application data streams, performs operations for initiating, ending, and pausing applications, installing the applications and de-installing them, mediating input information to the applications and output information from the applications, and any other tasks necessary for maintaining and running the applications in the user equipment 10.

On receiving a data stream, the application manager 56 performs the application operations according to the received application message, for example installs a user agent 415 in the user equipment by storing the received program code of the user agent 415 in the application database 57.

Figure 4A:
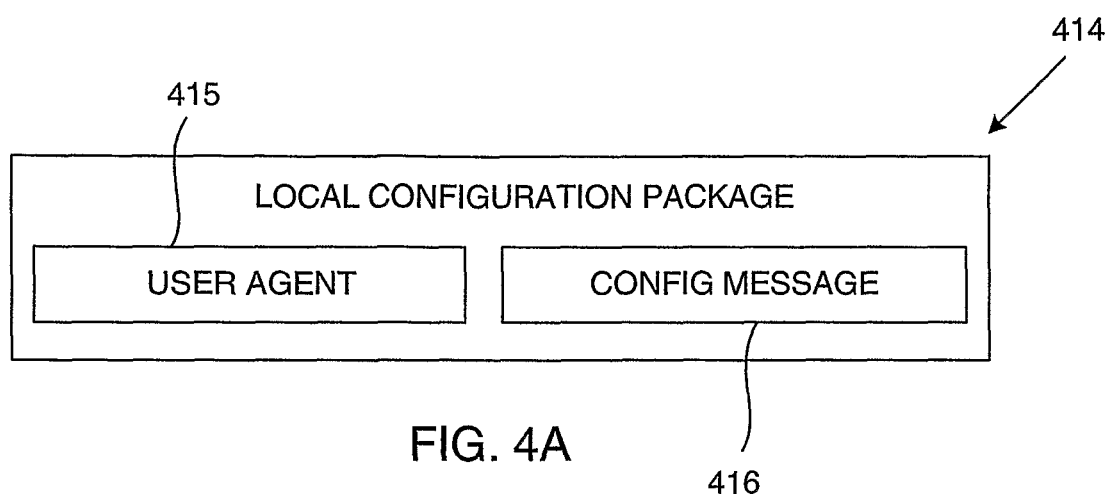
FIGS. 4A and 4B are block diagrams showing components of two embodiments of a local configuration package.
Figure 4B:
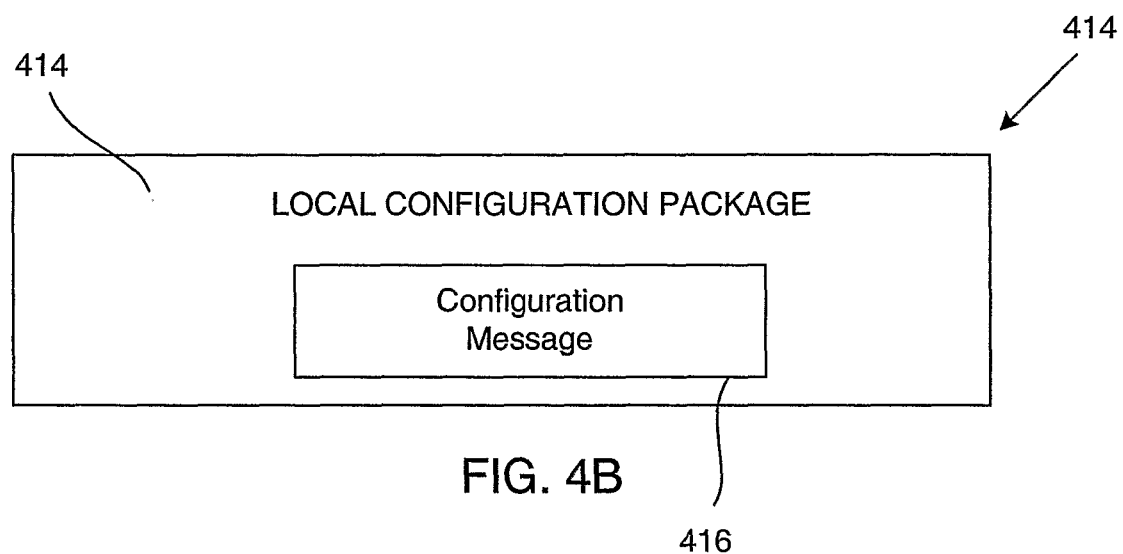

In the present embodiment, a local configuration package $lcp_{cf}$ 414 comprises a user agent 415, and the configuration message $msg_{cf}$ 416 (see FIG. 4a). When the user agent 415 is received in the user equipment 10 and installed as described above, it reads the configuration message $msg_{cf}$ 416, initiates a function that performs a predefined algorithm (preprocessing algorithm 57a and transform 57b) that corresponds with the format transformation algorithm 58 in the preprocessor 53 of the signal processing unit, and transforms the configuration message $msg_{cf}$ 416 into the format $msg_{cf,P}$ which is compatible with and understood by the configuration manager 55. Furthermore, the user agent inputs the application originated modified configuration message $msg_{cf,P}$ 60 to the inbox 54. The modified configuration message 60 is interpreted by the inbox 54 to be a normal over-the-air configuration message 60 (received from the radio unit 407) and an operation for authorizing a configuration operation, as disclosed above, is initiated. If a positive user response is received via the interface 3 52, the inbox 54 interprets the configuration operation as acceptable, and forwards the data to the configuration manager 55, which performs the requested configuration database operation.

It should be noted that the division of the operations of the network node 14, the configuration manager 55 and the inbox 54 is merely illustrative. For example, the functionality for initiating an authorization for a configuration operation may be implemented in the inbox or in the configuration manager. Correspondingly, the functionality for initiating an authorizing for an application operation may be implemented in the inbox or in the application manager.

Through the above disclosed device structures and functions, configuring of the user equipment 10 may be performed locally by a third party, i.e. a party that is not the equipment manufacturer or the service provider. This has not been possible before and therefore the present embodiment provides a significant advantage for the configuration operations in challenging or non-existent radio environment, for example in the areas of poor network coverage. The above structures and functions may be implemented without major changes to the configurations, protocols and/or interfaces of the equipment involved. Additionally, the operations in the network node comprise substantially combining a received configuration message with a generic user agent. This is a straightforward operation, and does not require high technical skills from the operator of the network node 14 (in most of the cases the owner of the user equipment 10). The embodiment of the present invention thus provides an easy to use mechanism that may be comfortably distributed to a plurality of users.

The use of a user agent 415 and an inbox 54 provides a possibility for interaction with the user, and thus provides a further advantage of the present embodiment. The user agent 415 may be configured to provide the user with two or more alternative configurations, of which the user may choose the one most advantageous to the current purpose. Alternatively, the user agent 415 may be configured to output the current configuration to the user, and provide him or her with the possibility to edit one or more of the parameters of the configuration. This gives a feeling of control, and improves the user-friendliness of the provisioned service.

Figure 6:
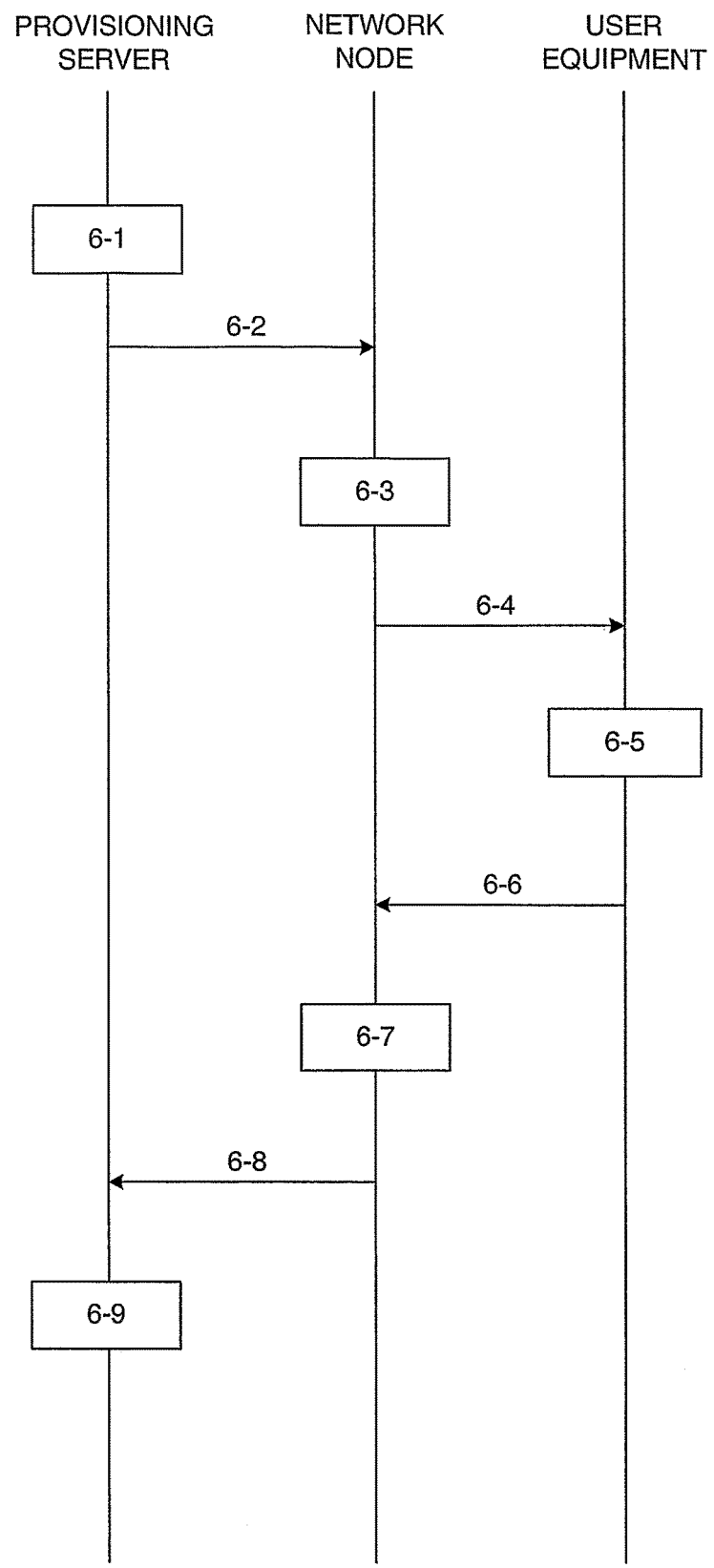
FIG. 6 is a signalling chart illustrating a method for configuring the user equipment in the embodiment shown in FIGS. 1 to 5.

The signalling chart of FIG. 6 illustrates a method for configuring the user equipment 10 in the embodiment of FIGS. 1 to 5. In Step 6-1, the provisioning server PS 13 generates the configuration message $msg_{cf}$ 416, and sends at Step 6-2 it over the IP packet data network to the network node NN 14. The network node NN 14 creates at Step 6-3 a local configuration package $lcp_{cf}$ 414 comprising a user agent 415, and the configuration message $msg_{cf}$ 416 and forwards at Step 6-4 the local configuration package $lcp_{cf}$ 414 to the user equipment UE 10. The user equipment 414 installs at Step 6-5 the user agent 415. At the end of installation, the user agent 415 is activated, whereby it reads the configuration message $msg_{cf}$ 416, and performs a predefined algorithm that transforms the configuration message 416 into the format $msg_{cf,P}$ accepted by the configuration manager 55. The transformed configuration message 60 is input to the inbox 54 that considers it a normal configuration message 60 and from there on processes the request normally.

Steps 6-6 to 6-9 illustrate an optional acknowledgement mechanism that may be added to the implementation. The user agent 415 may be configured to monitor the progress of the configuration procedure in the user equipment 10, and detect whether the procedure was successful or not. In response to the detection, the user equipment 10 may thus return at Step 6-6 to the local network node 14 an OK/NOK message. The network node 14 packages this into a format corresponding to a conventional over-the-air acknowledgement message and sends at Step 6-8 the message to the provisioning server 13. The provisioning server 13 marks the configuration completed and ends the configuration session at Step 6-9.

Figure 7:
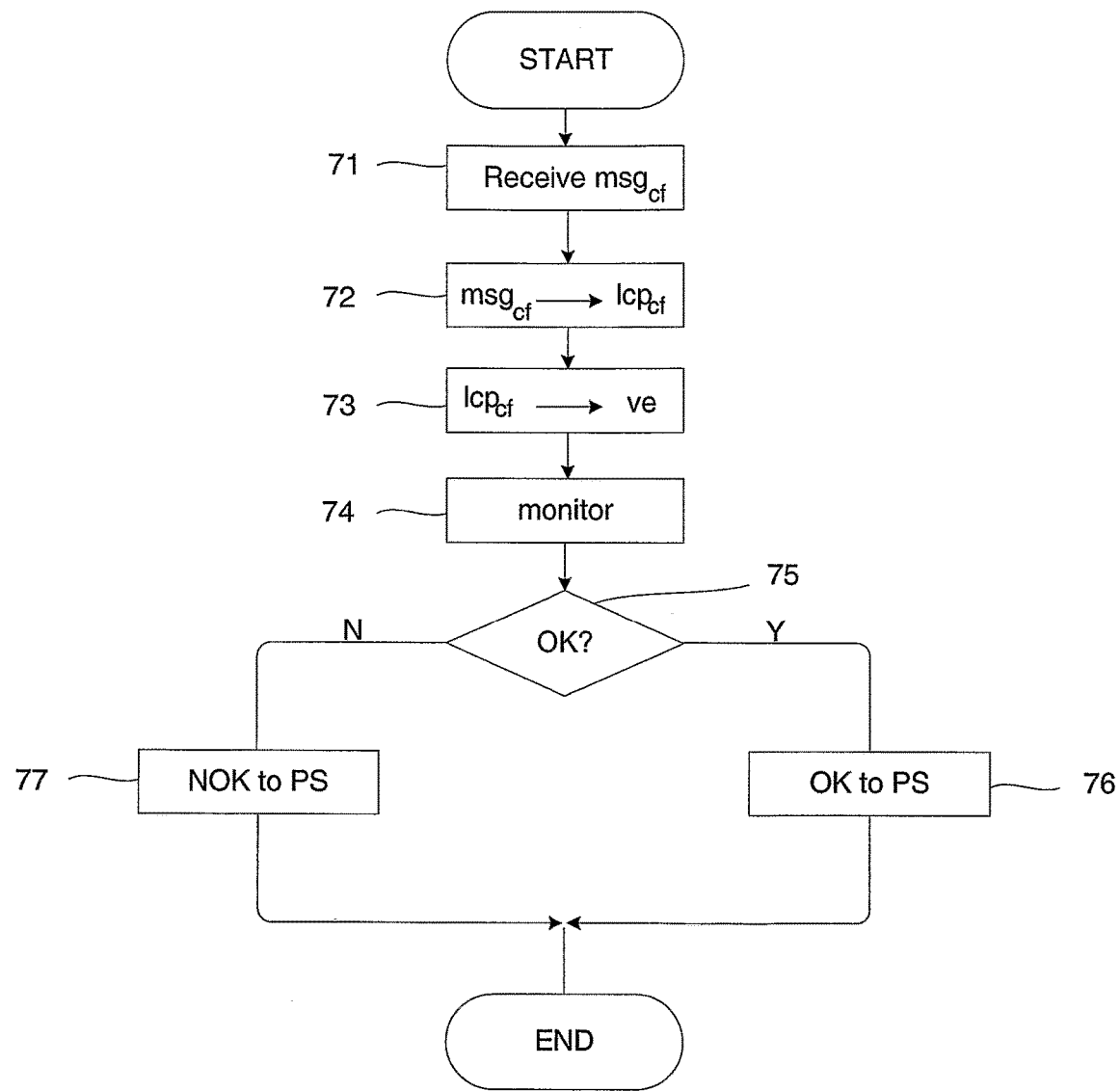
FIG. 7 is a flow chart illustrating a method of configuring the user equipment in the embodiment of FIGS. 1 to 5 from the point of view of the network node.

The flow chart of FIG. 7 illustrates a method for configuring user equipment in the embodiment of FIGS. 1 to 5 from the point of view of the optional network node 14. The network node 14 receives at Step 71 the configuration message $msg_{cf}$ 416 and, as described above, creates at Step 72 a local configuration package $lcp_{cf}$ 414 comprising a user agent 415, and the configuration message $msg_{cf}$ 416. The network node 14 sends at Step 73 the local configuration package $lcp_{cf}$ 414 to the user equipment 10. In case the optional acknowledgement mechanism is in use, the network node 14 begins to monitor at Step 74 if a response by the user agent 415 installed in the user equipment 10 is received, or if a predefined period for responding is exceeded. If a positive response is received at Step 75, the network node 14 generates and sends at Step 76 a positive acknowledgement message to the provisioning server 13. If a negative response is received, or a predefined period for responding is exceeded, the network node 14 generates and sends at Step 77 a negative acknowledgement message to the provisioning server 13.

Figure 8:
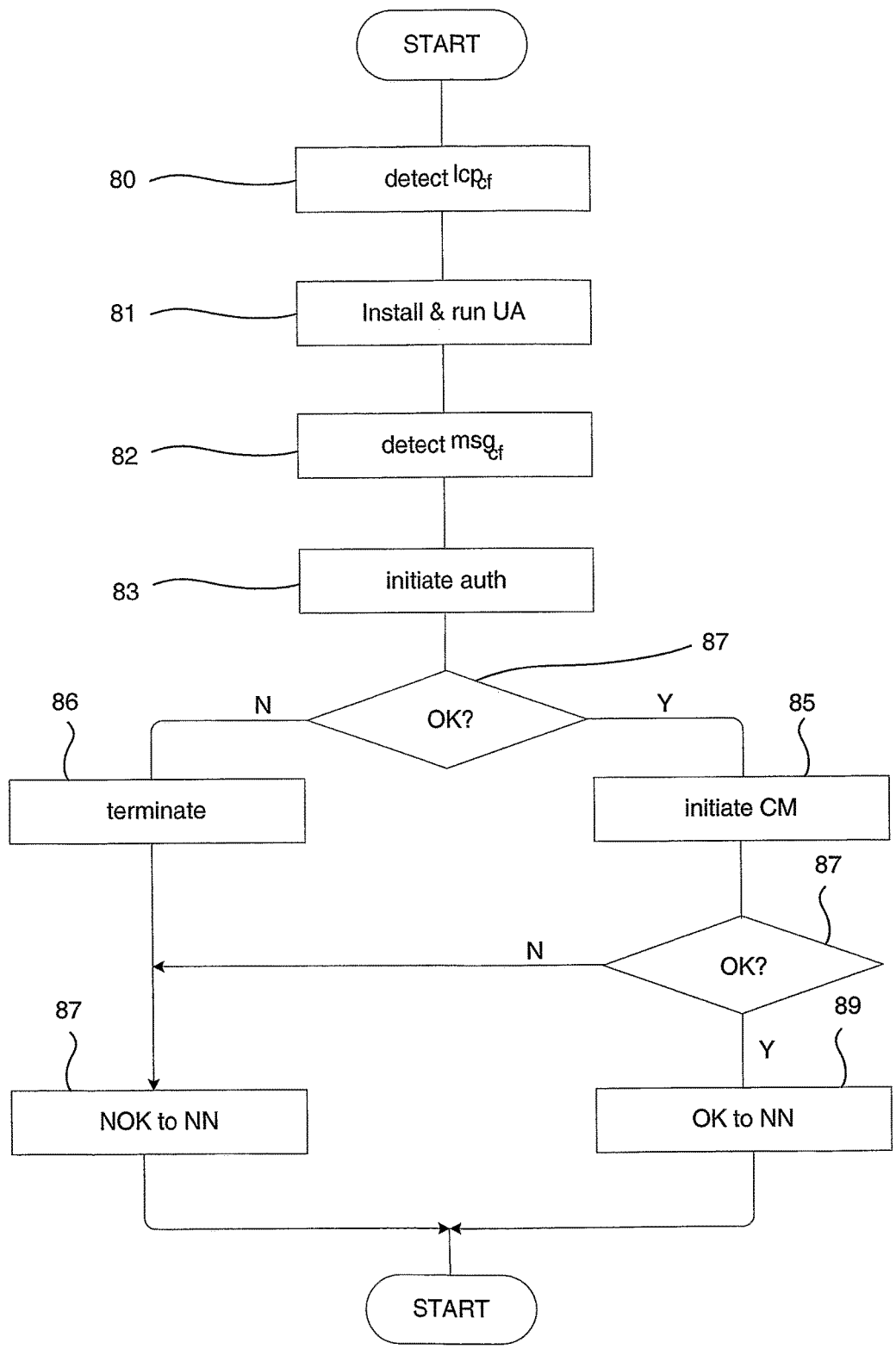
FIG. 8 is a flow chart illustrating a method of configuring the user equipment in the embodiment of FIGS. 1 to 5 from the point of view of the user equipment.

The flow chart of FIG. 8 illustrates a method for configuring user equipment 10 in the embodiment of FIGS. 1 to 5 from the point of view of the user equipment 10. The user equipment 10 detects at Step 80 the local configuration package $lcp_{cf}$ 414 and interprets it to be a typical user agent 415. The user equipment 10 installs at Step 81 the user agent 415 and, according to a request programmed to the application, activates it. As described above, the user agent 415 performs a predefined transformation algorithm 57a using a stored transform 57b that transforms the configuration message 416 into the format $msg_{cf,P}$ accepted by the configuration manager 55, and inputs the transformed configuration message 60 into the inbox 54 of the user equipment 10. The user equipment 10 thus detects at Step 82 the configuration message 60, and initiates a conventional user authorization. If the user response is positive at Step 84, the modified configuration message 60 is forwarded to the configuration manager 55 and the required configuration database operation is performed in the user equipment 10. Otherwise the procedure is terminated at Step 86.

In case the optional acknowledgement mechanism is in use, the user agent 415 monitors at Step 87 the progress of the configuration procedure. If the configuration is successfully completed at Step 87, the user agent 415 generates an OK message that the user equipment 10 sends at Step 89 to the network node 14, and the configuration procedure in the user equipment ends. Otherwise a NOK message is sent at Step 88 and the configuration procedure in the user equipment ends.

A second aspect of the present invention is now described in a further embodiment with reference to FIG. 9 to 12. This embodiment is directed to a method and system for securely registering and authenticating subscribers of a communications service.

Whilst the present embodiment is described in the context of a mobile telecommunications device, such as a mobile telephone, the second aspect of the present invention is not limited to this application. Rather, the present invention can be applied to any method or system for securely registering and authenticating subscribers of a communications service.

The term 'user device' as used herein after refers to user equipment, which in this non-limiting embodiment is a mobile telecommunications device (handset). The term 'provisioning server' has the same meaning as that described in the previous embodiment namely to a provisioning system. The term 'user credentials' as set out in the present embodiment refers to a username and password. However, this term has a broader meaning, which extends to any means for identifying a user and then permitting verification of that user's identity. An example of this could be a user account number and a PIN.

Figure 9:
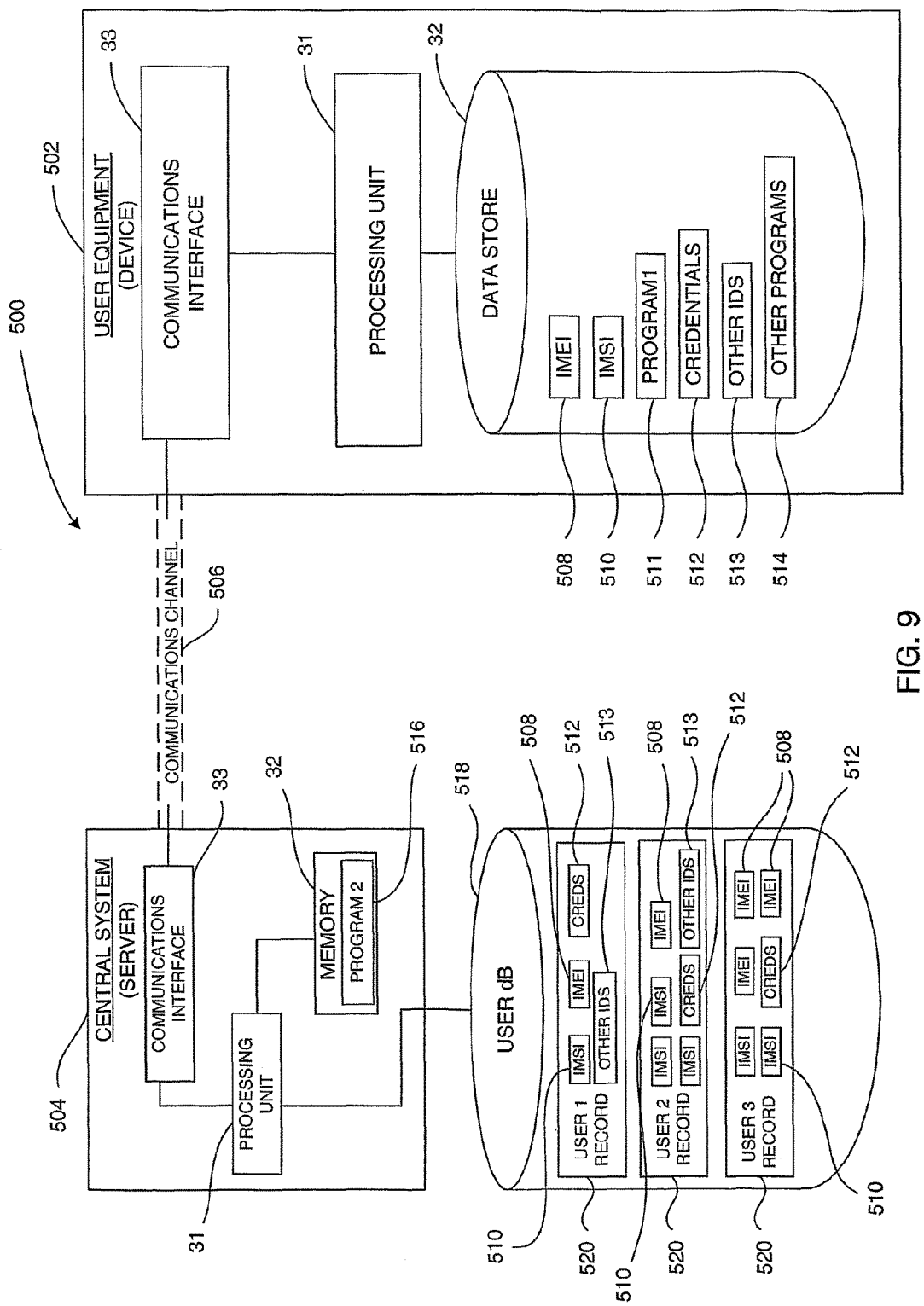
FIG. 9 is a schematic block diagram showing a provisioning server and user equipment seeking to securely register and be authorised to use the service provided by the provisioning server in accordance with an embodiment of the present invention.

Referring now to FIG. 9, there is shown a system 500 comprising a user device 502 and a provisioning server 504 for providing a service to the user device via a communications channel 506. The communications channel can be any communications channel that has been described in the previous embodiment, such as that provided by a combination of an IP packet data network 12 and a public land mobile network (PLMN) infrastructure 11 (see FIG. 2). However, preferably the communications channel comprises a local area network such as a WiFi network a WiFi connection to the Internet (as described in the IEEE 802.11 specification).

The user device 502 has a structure as described generally in FIG. 3 of the previous embodiment and comprises a processing unit 31, a communications interface 33 and a memory (data store) 32. However, the data store 32 in this embodiment stores unique identifiers for the device itself (an IMEI) 508, for a SIM providing a network identity (IMSI) 510, a configuration program 511 for configuring the user device 502 to operate in the manner to be described below, and optionally, a set of credentials 512 identifying the user uniquely to the service provider (central server 504). The data store 32 also stores other programs 514 installed on the device and other identifiers 513 of data stored on the device. Examples of such identifiers include the Integrated Circuit Card Identifier (ICCID), the handset agent ID, low level IDs including revision numbers for the mobile device and the programs installed on the mobile device and also code IDs indicating where the programs installed on the device originated from. Knowledge of these other IDs 513 is very helpful to a provisioning server 504 in that it assists the server in determining the exact capabilities of the device and thus enables more accurate configuration of the device 502.

The server 504 also has a structure as described previously in FIG. 3 of the previous embodiment and comprises a processing unit 31, a communications interface 33 and a memory 32. The memory 32 also stores a server program 516 for configuring the server 504 to operate in the manner, which is described below with reference to FIGS. 10 to 12. Also in this instance the server 504 is provided with a user database 518, which stores a plurality of user records 520 each holding information relating to a subscriber of the service provided by the server 504. Each record 520 comprises at least one IMEI 508 and at least one IMSI 510 for the registered subscriber, together with a set of user credentials 512 and the other IDs 513 described above.

Figure 10:
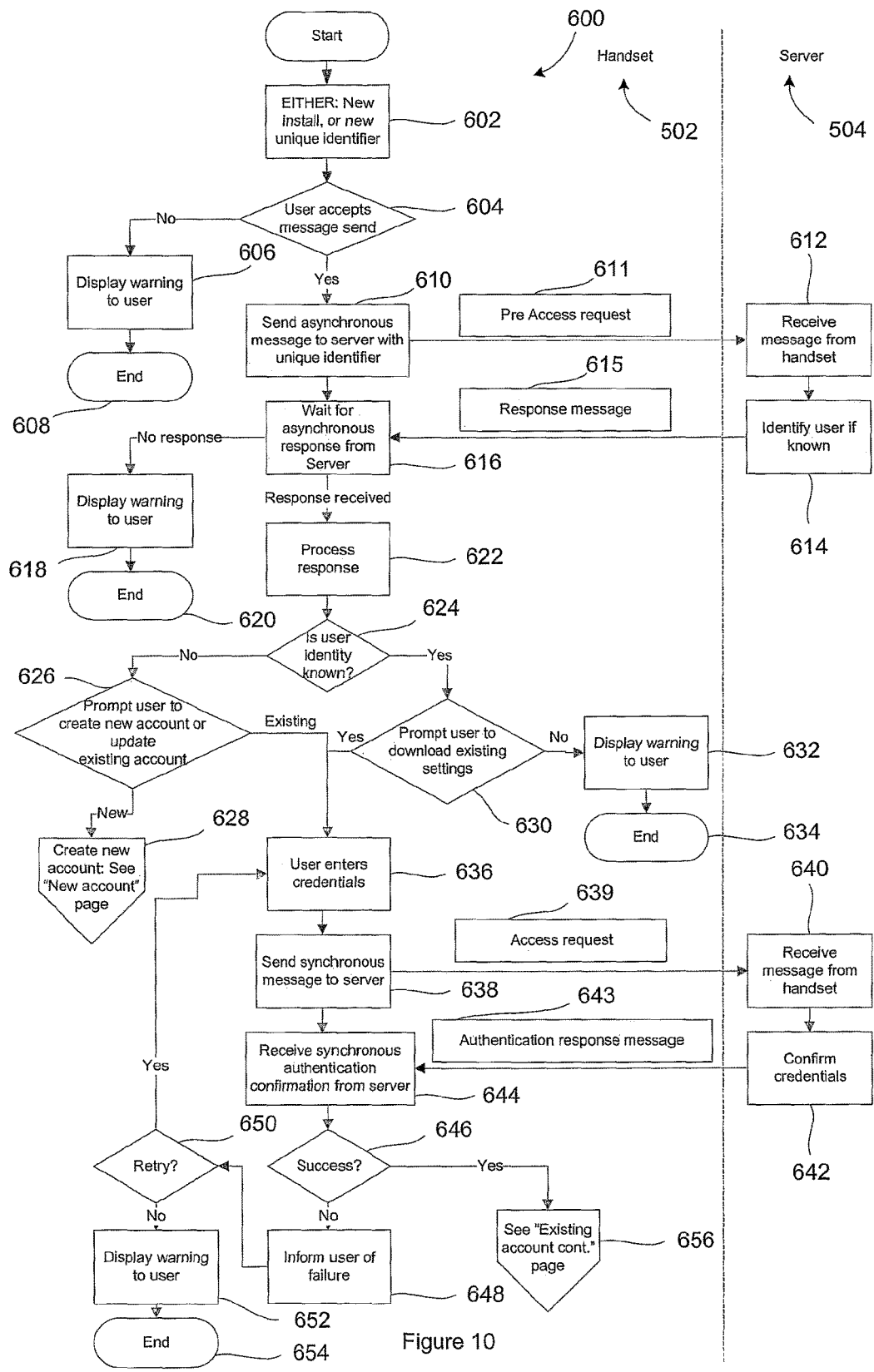
FIG. 10 is a flow chart illustrating a method of registering the user equipment to the provisioning system of FIG. 9.

Referring now to FIG. 10, a method of registering the user device to the provisioning server 504 is described. The method 600 commences with the user device obtaining at Step 602, the configuration program 511 from any source (from a download site, from a supplier website or even from a previously registered subscriber).

The method 600 continues with the configuration program 511 determining at Step 604 whether the user of the device 502 wishes to register with the service provided by the provisioning server 504. If the user indicates that they do not wish to register, then a warning is displayed at Step 606 to the user on the user device 502 and the method ends, at Step 608. However, if the configuration program 511 determines that the user does wish to register then the configuration program 511 retrieves, at Step 610, the unique device identity and the device's network identity, namely the IMEI 508 and the IMSI 510; these identifiers are simply read from the data store 32.

The device 502 constructs and then sends, also at Step 610, via the communications channel 506 an asynchronous pre-access request message 611 to the server 504 containing the unique identifiers 508, 510. It is also possible to send some of the other identifiers 513 at this stage such as the ICCID, though this is not essential.

The server 504 receives, at Step 612, the asynchronous message and determines if any of the identifiers 508, 510 is previously known by searching the plurality of user records 520 stored in its database 518 for a match. If an identifier match for any of the received identifiers occurs, then an asynchronous response message, for example an SMS message, is constructed at Step 614 and sent back to the device 502 via the communications channel 506 which is part of a public communications network that can be assumed to be relatively secure. The response message 615 indicates that the user is known to the server 504, typically by a flag being set in the response message. The purpose of sending the response message 615 back to the device 502 is to enable subsequent verification that the user controls the device whose identifiers were passed to the server previously. This can be considered within a mobile environment to be a GSM check, which can be a requirement of the configuration program 511 running on the device 502. If the received identifiers 508, 510 are unknown, the response message 615 is still sent but indicating that that the user is unknown.

Also, whether or not there is a match at Step 614, the details of the pre-access request 611 are recorded in the server session log (not shown). This can be of use later if an access request 639 needs to be verified as being authentic.

Figure 12:
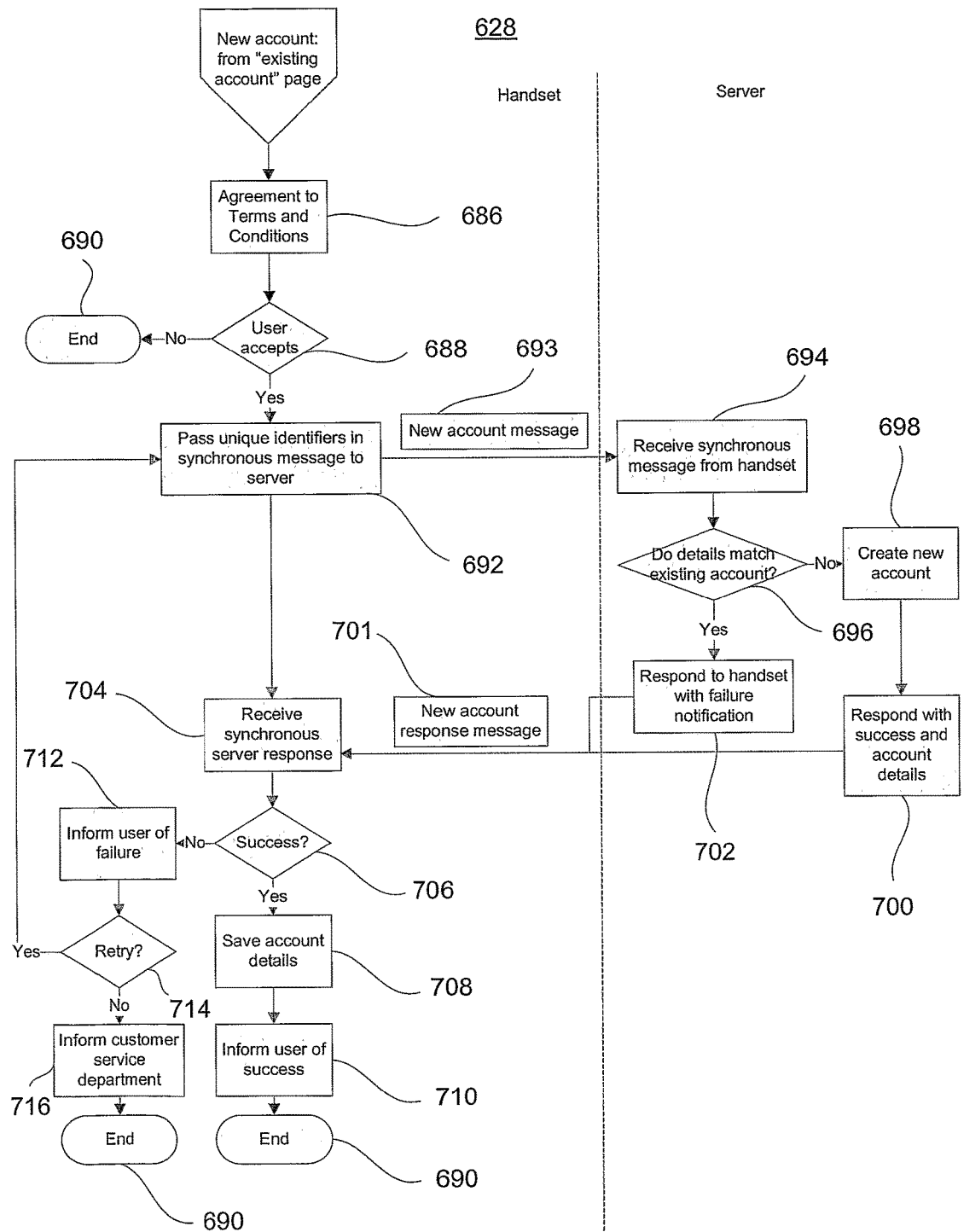
FIG. 12 is a flow chart illustrating a continuation of the method of FIG. 10 showing the case where there is a new account to be created for the user equipment.

The program 511 then processes at Step 622 the response message and determines at Step 624 whether the identifiers were known to the server 504. If the device and network identifier pair 508,510 are unknown, the program 511 determines at Step 626 whether a new account record 520 is required or whether an existing account record 520 is to be updated with the new information. If a new account record is required, the method continues at Step 628 as is shown in FIG. 12 and is described later. However, if an existing user account record 520 is to be updated with all new unique identifiers then the user credentials are entered at Step 636 (described below).

If the device and network identifier pair 508, 510 were known from Step 622, the user is prompted at Step 630 to enter the user credentials 512 which relate to that account record 520.

If such user credentials 512 are not entered, then the program 511 displays at Step 632 a warning to the user and the method ends at Step 634. If, however, the user credentials 512 are entered at Step 636 (or the device simply retrieves the stored set of credentials 512, such as username and password), then an access request message 639 is constructed which includes the user credentials 512 and the unique information which relates to the previously transmitted identifier pair 508, 510.

The device 502 then sends at Step 638 the access request message 639 to the server 504 as a synchronous message, for example an HTTPS post. The program 511 expects with a synchronous message to receive an automatic confirmation of delivery of the message within the messaging protocol. This assists in the security of the program as such a response can be a requirement of proceeding with the next steps in the operation of the device 502.

The server 504 receives at Step 640 the synchronous access request message 639 and searches at Step 642 for the credentials 512 in its database 518. It determines at Step 642 if the credentials 512 are correct, and if so, returns a synchronous authentication response message 643 to the device 502 confirming success. If the credentials 512 are incorrect the server 514 returns a synchronous authentication response message 643 to the device 502 indicating failure.

The device receives, at Step 644, the synchronous authentication result message 643 from the server 504. If the device credentials 512 are incorrect as determined at Step 646, the program 511 informs the user of the failure at Step 648 and determines at Step 650 whether the user wishes to retry. If the user does wish to retry, the user is taken back to the user credential entry stage at Step 636. Alternatively, a warning is presented at Step 652 to the user and the method exits at Step 652. If however the device credentials 512 are determined to be correct at Step 646, then the method 600 progresses to the updating an existing account stage at Step 656 as described below with reference to FIG. 11.

Figure 11:
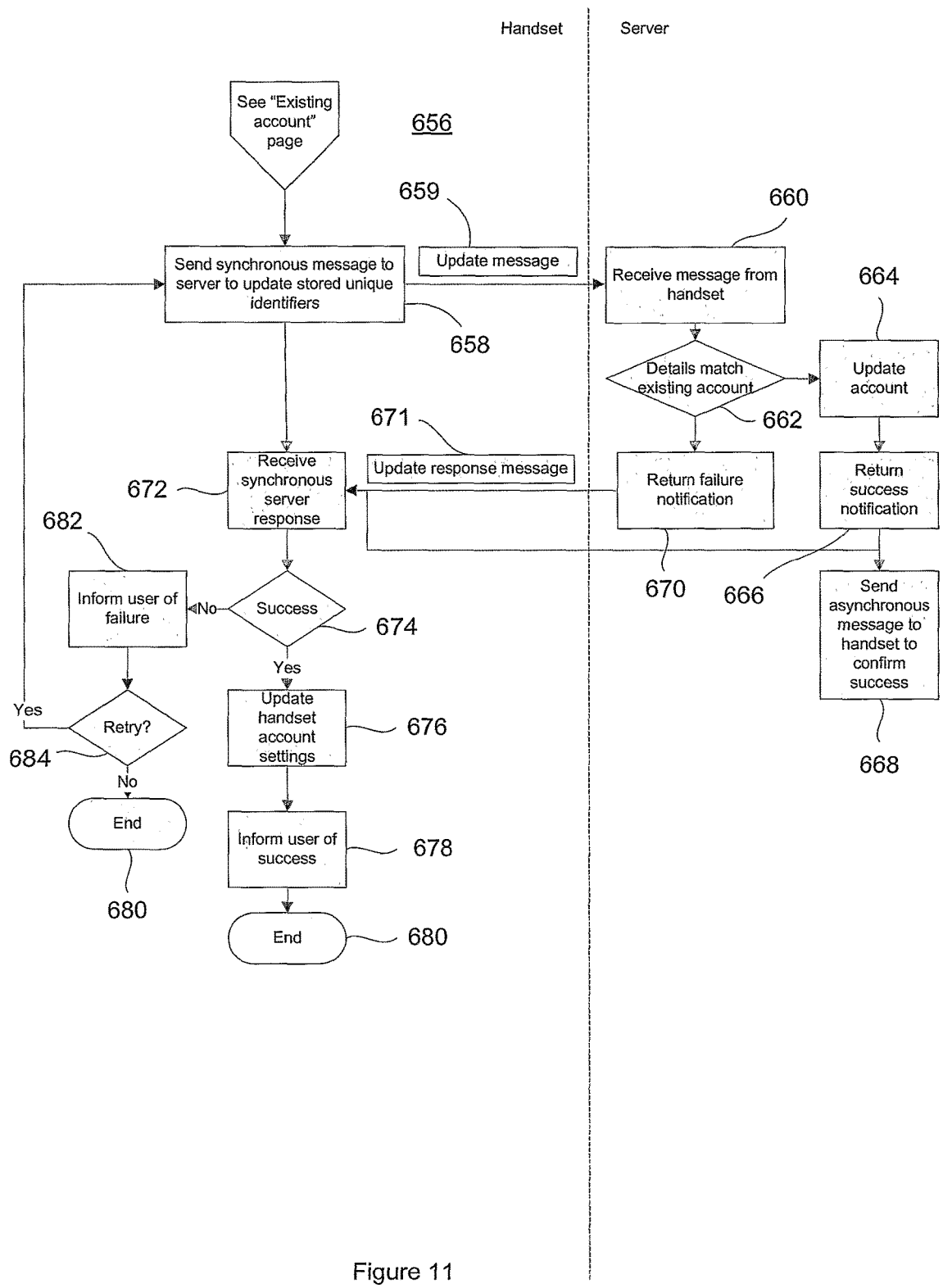
FIG. 11 is a flow chart illustrating a continuation of the method of FIG. 10 showing the case where there is an existing account for the user equipment.

Referring to FIG. 11, the updating an existing account record stage 656 of the method 600 is described. This stage progresses on the assumption that the user device has been successful with its access request 639 as determined at Step 646 of FIG. 10 such that there is an existing account record 520 for the user at the server 504.

The configuration program 511 constructs at Step 658 a synchronous update message 659, which contains the device and network identifier pair 508, 510, and all the other identifiers 513 for the programs on the device 502, including the source of the configuration program 511. The device 502 then sends at Step 658 the synchronous update message 659 to the server 504.

The server 504 receives, at Step 660, the update message 659 from the user device 502 and compares at Step 662 its details with those of the user's existing user account record 520 previously determined. If the details stored in the user's account record 520 do not match those provided in the update message 659, the server program 516 knows that there is new information in the update message 659 which has to be added to the user's account record 520. The program 516 then instructs the user database 518 to update, at Step 664, the user account record 520 with the new details. The server then constructs and sends, at Step 666, an update response message 671 which confirms a successful update of the user's account record 520. This response message 671 is sent as a synchronous message to the user device 502.

Also the device 502 is sent at Step 668 a further update confirmation message (not shown) which is an asynchronous message, such as an SMS message which simple confirms at a user level that the update has been successful.

Alternatively, if the details stored in the user's account record 520 all match those provided in the update message 659, then there is no new data to update the user account record with. In this case, the server constructs at Step 670, an update response message 671 which confirms an unsuccessful update of the user's account record 520. This response message 671 is then sent as a synchronous message to the user device 502.

The user device receives at Step 672 the update response message 671 and determines at Step 674 whether or not the update was successful.

If the server has updated the user's account record 520, then the user device's account settings (such as those provided in the SIP profiles 406*a* and the VoIP profiles 406*b*) are updated, at Step 676, with the new identifiers (new details) to enable the user to try to use this identifier pair at the next time the user device must obtain authorisation from the server. The user is then informed, at Step 678, of the successful updating of the user device's account settings and the method 600 ends at Step 680.

If the server has indicated an error/failure in the update response message 671, the configuration program 511 informs, at Step 682, the user of this and offers, at Step 684, the user the option of retrying the update procedure. If the user declines this option the method 600 ends at Step 680. Alternatively, if the user accepts, the configuration program retries, at Step 658, constructing and sending the update message 659 to the server 504.

Referring now to FIG. 12, the method 600 continues assuming there to be no existing account record 520 for the user at the server 504 and the user has chose to create a new account record at Step 626, is now described.

The method 600 continues with the terms and conditions for the service being presented, at Step 686, to the user. The method then determines, at Step 688, whether the user accepts these terms and conditions. If they do not, the method ends at Step 690.

If the user accepts, then the configuration program 511 constructs at Step 692 a synchronous new account message 693 which contains the device and network identifier pair 508, 510, and all the other identifiers 513 for the programs on the device 502, including the source of the configuration program 511. The device 502 then sends at Step 692 the new account message 693 to the server 504.

The server 504 receives, at Step 694, the new account message 693 from the user device 502 and compares, at Step 696, the identifiers 508, 510 provided in the new account message 693 with those stored in any of the user account records 520. If none of the identifiers 508, 510, stored in any one of the account records 520, match those provided in the new account message 693, the server program 516 instructs the user database 518 to create, at Step 698, a new user account record 520 comprising all of the new user details. The server 504 then constructs and sends, at Step 700, a new account response message 701 to the user device 502. The new account response message 701 confirms a successful creation of a new user account record 520 and includes details of the new user account record 520, such as the new user credentials 512 which have been assigned to this account record 520. This new account response message 693 is sent as a synchronous message to the user device 502, in view of the user account credentials contained therein.

Alternatively, if any of the identifiers 508, 510 stored in any of the user account records 520 match those provided in the new account message 693, the server constructs and sends, at Step 702, a new account response message 701 which confirms an unsuccessful creation of a new user account record 520. This new account response message 701 is sent as a synchronous message to the user device 502.

The user device 502 receives, at Step 704, the new account response message 701 and determines, at Step 706, whether or not the new account record 520 was successfully created.

If the server has created a new user account record 520, then the user device's account settings (such as those provided in the SIP profiles 406*a* and the VoIP profiles 406*b*) are saved, at Step 708, with the new identifiers to enable the user to try to use this identifier pair at the next time the user device 502 must obtain authorisation from the server 504. The user is then informed, at Step 710, of the successful creation of the new user account record 520 and the method 600 ends at Step 690.

If the server 504 has indicated an error/failure in the new account response message 701, the configuration program 511 informs, at Step 712, the user of this and offers, at Step 714, the user the option of retrying the new account set up procedure. If the user declines this option, a customer service department is notified, at Step 716, and the method 600 ends at Step 690. Alternatively if the user accepts, the configuration program 511 retries, at Step 692, constructing and sending the new account message 693 to the server 504.

Accordingly, the above embodiment can be considered to be a method and system for securely registering and authorising users of a telephony service where multiple unique identifiers may be required by each device and network identifier, using both synchronous and asynchronous messaging, whilst preventing the creation of duplicate accounts and ensuring that each unique identifier is verified for the prevention of fraud and other illegal activities. In another aspect, the present invention provides a computer program product encoding a computer program of instructions for executing a computer process.

In another aspect, the present invention provides a computer program distribution medium readable by a computer and encoding a computer program of instructions for executing a computer process.

The distribution medium may include a computer readable medium, a program storage medium, a record medium, a computer readable memory, a computer readable software distribution package, a computer readable signal, a computer readable telecommunications signal, and/or a computer readable compressed software package.

Embodiments of the computer process are shown and described in conjunction with FIGS. 4 to 6 and 9 to 12. The computer program may be executed in the signal-processing unit of the provisioning server, the network node or the user equipment.

It will be obvious to a person skilled in the art that, as the technology advances, the inventive concept can be implemented in various ways. The invention and its embodiments are not limited to the examples described above but may vary within the spirit and scope of the claims.

The invention claimed is:

1. A method of managing configuration of user equipment adapted for use in a cellular telecommunications network, the method comprising:
    receiving a user agent for installation on the user equipment; wherein the user equipment has (a) a processor, (b) an over the air (OTA) interface for receiving configuration data and a user agent, (c) a configuration data store for defining a configuration of the user equipment, and (d) a configuration manager for receiving configuration data in a compatible format which can be processed by the configuration manager for modifying the configuration data store;
    installing the user agent on the user equipment;
    receiving the configuration data to be used by the configuration manager for modifying the configuration data store, wherein the configuration data is in a format other than the compatible format, wherein the configuration data comprises an International Mobile Subscriber Identity Number
    transforming, using the installed user agent on the user equipment, the configuration data into the compatible format, and
    modifying, using the configuration manager on the user equipment, the configuration data store with the configuration data in the compatible format which can be processed by the configuration manager.

2. A method according to claim 1, wherein receiving configuration data comprises the user agent receiving configuration data.

3. A method according to claim 1, wherein receiving configuration data comprises receiving configuration data over the OTA interface.

4. A method according to claim 1, wherein receiving configuration data does not comprise receiving configuration data over the OTA interface.

5. A method according to claim 4, wherein receiving configuration data comprises receiving configuration data over a local wireless network.

6. A method according to claim 1, wherein receiving configuration data comprises one or more SMS messages received by the user equipment.

7. A method according to claim 6, wherein receiving configuration data comprises one or more SMS messages received by the user equipment which are concatenated to form a full data set.

8. A method according to claim 1, wherein the user equipment comprises an inbox from which the configuration data store receives configuration data in the compatible format and the method comprises inputting the configuration data transformed into the compatible format into the inbox.

9. A method according to claim 1, comprising seeking authorization from the user of the user equipment and receiving a response from the user, wherein the modifying step occurs only if the response confirms user-authorization.

10. A method according to claim 1, wherein the user agent comprises a generic user agent and the method further comprises reusing the user agent for transforming subsequent configuration messages.

11. A method according to claim 1, wherein the user equipment comprises a local radio communications unit and the method comprises receiving, with the local radio communications unit, the user agent and the configuration data together in a local configuration package message.

12. A method according to claim 11, comprising:
    delivering the configuration data to a network node, and
    transferring the configuration data from the network node to the user equipment over a local communication interface between the network node and the local radio communications unit of the user equipment.

13. A method according to claim 11, wherein the configuration data comprises information enabling the IMSI number to be used at the user equipment.

14. A method according to claim 1, wherein the configuration data comprises one or more International Mobile Station Equipment Identity (IMEI) number.

15. A method according to claim 1, wherein the configuration data comprises an International IMEI or IMSI such that the user is enabled to roam between multiple unique identifiers whilst still keeping the same subscriber account.

16. User equipment adapted for use in a cellular telecommunications network, the user equipment comprising:
   a processor;
   an interface block comprising of at least an over the air (OTA) interface wherein the interface block is adapted for receiving a configuration communication from a cellular telecommunications network, said configuration communication comprising configuration data to be used for modifying a configuration of the user equipment; wherein said OTA interface receives a user agent and the user agent is installed on the user equipment;
   a memory comprising a configuration data store for defining the configuration of the user equipment,
   a configuration manager executed by the processor for receiving the configuration data in a compatible format which can be processed by the configuration manager for modifying the configuration data store, wherein said OTA interface receives the configuration data in a format other than the compatible format;
   and
   wherein the installed user agent executed by the processor receives the configuration data and transforms the configuration data into the compatible format for processing by the configuration manager.

* * * * *